United States Patent [19]
Mammino et al.

[11] Patent Number: 6,067,430
[45] Date of Patent: May 23, 2000

[54] FLUORINATED CARBON FILLED FOAM BIASABLE COMPONENTS

[75] Inventors: Joseph Mammino; Kock-Yee Law, both of Penfield; Gerald M. Fletcher, Pittsford; Martin A. Abkowitz, Webster; Ihor W. Tarnawskyj, Webster; Kathleen M. McGrane, Webster, all of N.Y.

[73] Assignee: Xerox Corporation, Stamford, Conn.

[21] Appl. No.: 09/032,981

[22] Filed: Mar. 2, 1998

[51] Int. Cl.[7] .................... G03G 15/02; G03G 15/16; G07G 15/00
[52] U.S. Cl. .................. 399/174; 361/225; 399/313
[58] Field of Search .................... 399/174, 175, 399/176, 286, 313; 361/225

[56] References Cited

U.S. PATENT DOCUMENTS

| | | | |
|---|---|---|---|
| 4,524,119 | 6/1985 | Luly et al. | 430/108 |
| 4,831,977 | 5/1989 | Presswood | 123/193 P |
| 5,241,343 | 8/1993 | Nishio | 355/219 |
| 5,485,344 | 1/1996 | Matsumoto et al. | 361/225 |
| 5,582,886 | 12/1996 | Kitajima | 428/36.91 |
| 5,761,595 | 6/1998 | Tarnawskyj et al. | 399/308 |
| 5,849,399 | 12/1998 | Law et al. | 428/212 |

FOREIGN PATENT DOCUMENTS

| | | |
|---|---|---|
| O 736 051 B1 | 9/1997 | European Pat. Off. |
| 15960 | 1/1996 | Japan |
| 8-248733 | 9/1996 | Japan |

*Primary Examiner*—Joan Pendegrass
*Attorney, Agent, or Firm*—Annette L. Bade; Judith L. Byorick

[57] ABSTRACT

A biasable component having a fluorinated carbon filled polymer foam layer which exhibits controlled electrical conductivity and improved hardness is set forth.

22 Claims, 5 Drawing Sheets

FLUORINATED CARBON FILLED FOAM BIASABLE COMPONENTS

BACKGROUND OF THE INVENTION

The present invention relates to biasable system components for use in an electrostatographic, including digital, apparatus. The biasable system components may be useful as bias charging rollers, films, sheets, belts, sleeves, or the like, or bias transfer rollers, films, sheets, belts, sleeves, or the like. The biasable system components comprise a foam layer filled with or containing a conductive filler, preferably a fluorinated carbon filler. The present invention provides biasable system components with superior electrical and mechanical properties, including controlled conductivity in a desired resistivity range. Further, in embodiments, the durometer of the components is decreased allowing for adequate conformability and excellent nip performance. In addition, in embodiments, the components exhibit excellent properties such as statistical insensitivity of conductivity to changes in temperature and humidity, intense continuous corona exposure, corrosive environments, solvent treatment, running time or cycling to high electric fields and back.

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material such as toner onto the photoreceptive member such that the developing material is attracted to the charged image areas on the photoconductive surface. Thereafter, the developing material, and more specifically toner, is transferred from the photoreceptive member to a copy sheet or to some other image support substrate to create an image which may be permanently affixed to the image support substrate, thereby providing an electrophotographic reproduction of the original document. In a final step in the process, the photoconductive surface of the photoreceptive member is cleaned to remove any residual developing material which may be remaining on the surface thereof in preparation for successive imaging cycles.

Biasable members include both bias transfer members and bias charging members. Toner material can be transferred from a first image support surface (i.e., a photoreceptor) into attachment with a second image support substrate (i.e., a copy sheet) under the influence of electrostatic force fields generated by an electrically biased member, wherein charge is deposited on the second image support substrate by, for example, a bias transfer member or by spraying the charge on the back of the substrate.

An important aspect of the transfer process focuses on maintaining the same pattern and intensity of electrostatic fields as on the original latent electrostatic image being reproduced to induce transfer without causing scattering or smearing of the developer material. This important and difficult criterion is satisfied by careful control of the electrostatic fields, which, by necessity, should be high enough to effect toner transfer while being low enough to not cause arcing or excessive ionization at undesired locations. These electrical disturbances can create copy or print defects by inhibiting toner transfer or by inducing uncontrolled transfer which can easily cause scattering or smearing of the development materials.

Contact charging or bias charging members function by applying a voltage to the charge-receiving member (photoconductive member). Such bias charging members require a resistivity of the entire charging member within a desired range. Specifically, materials with too low resistivities will cause shorting and/or unacceptably high current flow to the photoconductor. Materials with too high resistivities will require unacceptably high voltages. Other problems which can result if the resistivity is not within the required range include low charging potential and non-uniform charging, which can result in poor image quality.

Therefore, it is important in biasable members, that the resistivity be tailored to a desired range and that the resistivity remain within this desired range. Accordingly, it is desirable that the resistivity be unaffected or virtually unaffected to changes in temperature, relative humidity, running time, and leaching out of contamination to photoconductors.

Attempts at maintaining an acceptable transfer field with regard to bias transfer members, have included adding ionic additives to elastomer layers of bias transfer members in an attempt to control the resistivity. U.S. Pat. Nos. 3,959,573 and 3,959,574 both to Seanor et al. describe adding additives such as a quaternary ammonium compound to hydrophobic and hydrophilic elastomeric polyurethane layers, respectively, in order to control the changes in resistivity due to changes in relative humidity. Similarly, U.S. Pat. Nos. 5,286,570, 2,259,990, 2,586,566 and 2,259,989, all to Schlueter, Jr. et al., describe the addition of an asymmetric ionic quaternary ammonium salt to a polyurethane elastomer to extend the useful electrical life of the polyurethane elastomers.

Attempts at controlling resistivity with regard to bias charging members have included adding ionic additives to elastomer layers. European Patent Application 0 596 477 A2, discloses a charging member comprising at least an elastic layer comprising epichlorohydrin rubber and a surface layer disposed thereon, the surface layer comprising at least a semiconductive resin and an insulating metal oxide contained in the semiconductive resin.

However, there are problems associated with the use of such additives. In particular, undissolved particles frequently bloom or migrate to the surface of the polymer and cause an imperfection in the polymer. This leads to nonuniform resistivity, which in turn, causes poor antistatic properties and poor mechanical strength. The ionic additives on the surface may interfere with toner release. Furthermore, bubbles may appear in the conductive polymer, some of which can only be seen with the aid of a microscope, others of which are large enough to be observed with the naked eye. These bubbles provide the same kind of difficulty as the undissolved particles in the polymer, namely poor or non-uniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results are color shifting and color deterioration. Ion transfer also increases the resistivity of the polymer member after repetitive use. This can limit the process and operational latitude and eventually the ion-filled polymer member will be unusable.

Conductive particulate fillers, such as carbon blacks, have also been used in an attempt to control the resistivity.

U.S. Pat. No. 5,112,708 to Okunuki et al., discloses a charging member comprising a surface layer formed of N-alkoxymethylated nylon which may be filled with fluorinated carbon.

U.S. Pat. No. 5,000,875 to Kolouch discloses tetrafluoroethylene copolymer compositions containing conductive carbon black or graphite fibers to increase conductivity when the tetrafluoroethylene copolymer has been treated with a fluorinating agent.

Carbon black particles can impart specific adverse effects. Such carbon dispersions are difficult to prepare due to carbon gelling, and the resulting layers may deform due to gelatin formation. In addition, the required tolerance in the filler loading to achieve the required range of resistivity is extremely narrow. This, along with the large "batch to batch" variation, leads to the need for extremely tight resistivity control. In addition, carbon filled polymer surfaces have typically had very poor dielectric strength and sometimes significant resistivity dependence on applied fields. This leads to a compromise in the choice of centerline resistivity due to the variability in the electrical properties, which in turn, ultimately leads to a compromise in performance.

U.S. Pat. No. 5,397,863 discloses film capacitors using polyimide materials and fluorinated carbons.

U.S. Pat. No. 5,556,899 discloses adding fluorinated carbon to polyimide materials to effect a change in the dielectric constant and the coefficient of thermal expansion of the polyimide for use in electronic packaging.

U.S. Pat. No. 5,571,852 discloses use of fluorinated carbon in polyimide materials for electrical conductor patterns.

U.S. Pat. No. 5,591,285 discloses adding fluorinated carbon to fluoropolymers and exposing the material to ultraviolet radiation for electronic packaging applications.

The present inventors have found that the addition to fluorinated carbon to polymers provides for a component which has a resistivity which is relatively stable and insensitive to environmental changes such as changes in temperature, humidity and electrical cycles. However, addition of fluorinated carbon to polymers results in a dramatic increase in durometer which may adversely affect the component's performance at the nip. In fact, addition of 35 weight percent of fluorinated carbon has been shown to increase the durometer of a fluoropolymer outer surface of a biasable system member from 55 to 95 Shore A, resulting in inferior nip performance. More specifically, the biasable member must be resiliently pressed against a photoreceptor member or substrate to obtain a given contact or nip width therebetween, before the photoreceptor or the paper can be sufficiently charged by a biasable member. Further, the biasable member must possess suitable softness so that the operating life of the photosensitive member (in the case of a bias charging member) can be extended as long as possible. The harder the conductive foam member, the greater the wear on the photoconductive member and the greater the tendency that the biasable member will scratch the photoreceptor.

There exists a specific need for bias system components which allow for a stable conductivity in the desired resistivity range without the problems associated with ionic additives and carbon additives, and without the dramatic increase in durometer.

SUMMARY OF THE INVENTION

The present invention provides, in embodiments, a biasable component comprising a fluorinated carbon filled polymer foam layer, wherein the component is electrically conductive.

The present invention further includes, in embodiments, an electrostatographic machine comprising a biasable component capable of receiving an electrical bias, wherein the biasable component comprises a fluorinated carbon filled polymer foam layer and wherein the component is electrically conductive.

BRIEF DESCRIPTION OF THE DRAWINGS

For a better understanding of the present invention, reference may be had to the accompanying figures.

DETAILED DESCRIPTION OF THE INVENTION

The present invention relates to biasable members, and in preferred embodiments biasable films or rollers, comprising a filled polymer foam layer, preferably a fluorinated carbon filled polymer foam layer.

Figure 1:
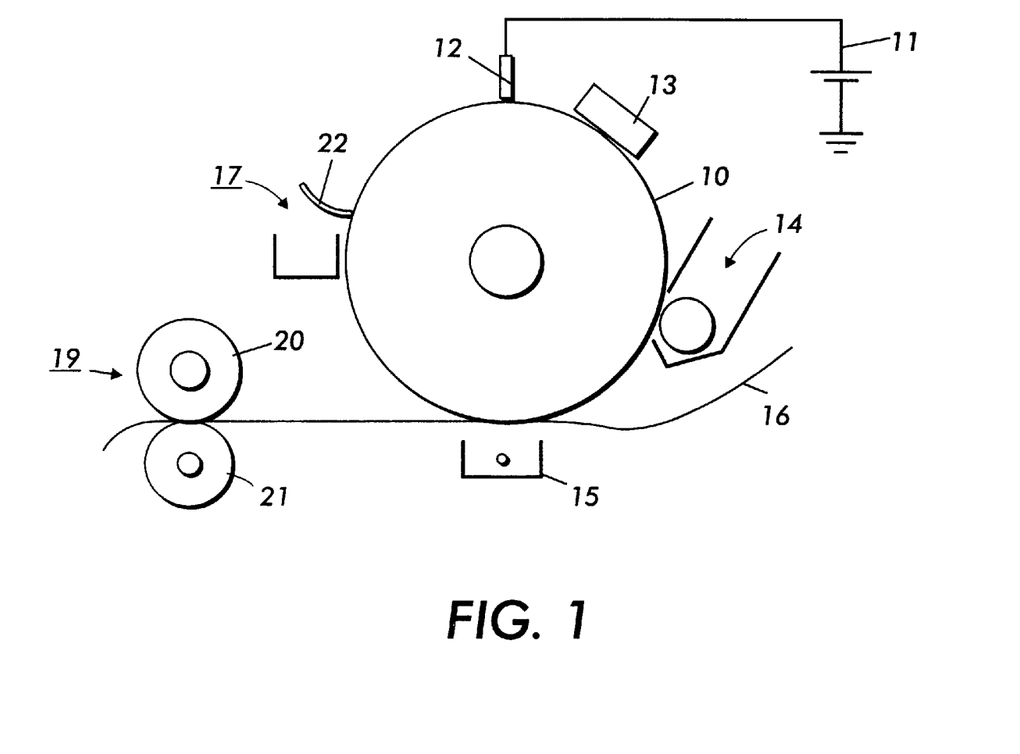
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer.

Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
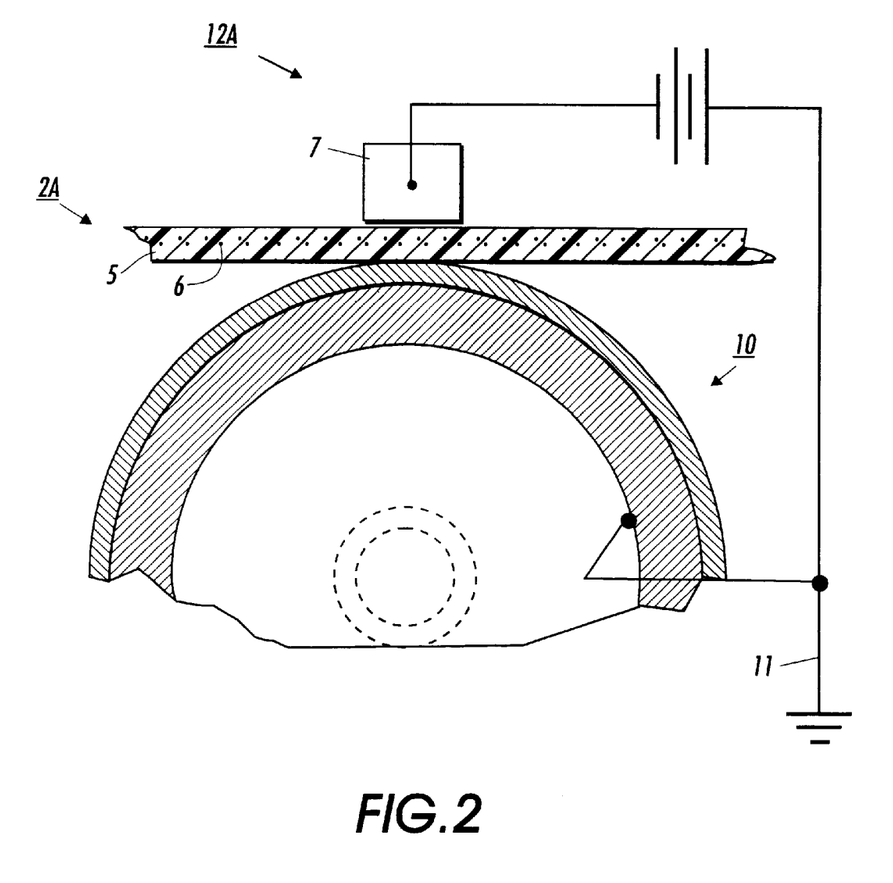
FIG. 2 is a schematic view of an image development system containing a bias charging member.

FIG. 2 demonstrates an embodiment of the present charging system including a bias charging device 12A having a charge member 2A held in contact with an image carrier implemented as a photoconductive drum 10. However, the present invention can also be used for charging a dielectric receiver or other suitable member to be charged. The photoconductive member 10 may be a drum or a belt or other known photoconductive member. A DC voltage and optional AC current is applied from a power source 11 to the charge member 2A to cause it to charge the photosensitive member 10. The power is either directly supplied to charge member 2A or is supplied to charge belt 2A via a bias supplying member 7. The charge belt 2A has a conductive foam layer 5, and has conductive particles 6 dispersed therein, such as, for example fluorinated carbon.

Figure 3:
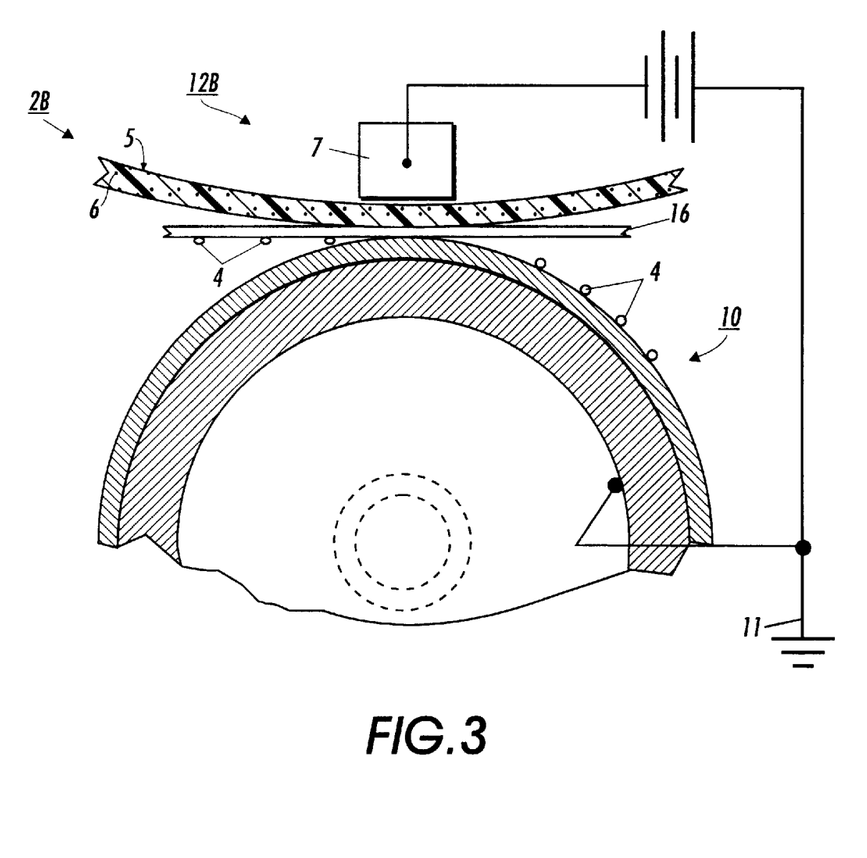
FIG. 3 is a schematic view of an image development system containing a bias transfer member.

FIG. 3 demonstrates an embodiment of the present transfer system including a bias transfer device 12B having a bias transfer member 2B held in contact with an image carrier implemented as a photoconductive drum 10. The photoconductive member 10 may be in the form of a belt or drum or other suitable photoconductive member. A DC voltage and optional AC current is applied from a power source 11 to the bias transfer member 2B to cause it to charge the back side of the copy substrate 16 so as to attract toner 4 from photoreceptor 10 to copy substrate 16. The power is either directly supplied to bias transfer member 2B or is supplied to bias transfer member 2B via a bias supplying member 7. The bias transfer member 2B has a conductive foam layer 5, and has conductive particles 6 dispersed therein, such as, for example, fluorinated carbon.

Tuning the bias member to the desired resistivity is important in imparting the desired function to the member. The resistivity can be selected not only by using the appropriate curing agents, curing time and curing temperature as set forth herein, but also by selecting a specific fluorinated carbon, or mixtures of various types of fluorinated carbon and selecting the specific fluorinated carbon loading. The percentage of fluorine in the fluorinated carbon will also affect the resistivity of the polymer when mixed therewith.

It is preferable that fluorinated carbon be dispersed in the foam layer. Fluorinated carbon, sometimes referred to as graphite fluoride or carbon fluoride, is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systemic, uniform variation of its electrical resistivity properties.

Fluorinated carbon refers to a specific class of compositions which is prepared by reacting fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some possible confusion in the art, it is apparent that fluorinated carbon is neither a fluorocarbon nor a fluoropolymer and the term is used in this context herein.

The fluorinated carbon may include the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608, the entire disclosures each of which are incorporated by reference herein. Essentially, fluorinated carbon is produced by heating a carbon source such as amorphous carbon, coke, charcoal, carbon black or graphite with elemental fluorine at elevated temperatures, such as 150°–6000° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x representing the number of fluorine atoms and generally being up to about 1.5, preferably from about 0.01 to about 1.5, and particularly preferred from about 0.04 to about 1.4. The formula $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N. Y.; Diakin Industries, Inc., New York, N.Y.; and Advance Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$. The preparation of $(C_2F)_n$ type fluorinated carbon is described, for example, in above-mentioned U.S. Pat. No. 4,247,608, the disclosure of which is herein incorporated by reference in its entirety, and also in Watanabe et al., "Preparation of Poly(dicarbon monofluoride) from Petroleum Coke," Bull. Chem. Soc. Japan, 55, 3197–3199 (1982), the disclosure of which is also incorporated herein by reference in its entirety.

In addition, preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

The following chart illustrates some properties of four fluorinated carbons of the present invention.

| PROPERTIES | ACCUFLUOR ® | | | | UNITS |
|---|---|---|---|---|---|
| GRADE | 1000 | 2065 | 2028 | 2010 | N/A |
| Feedstock | Coke | Conductive Carbon Black | | | N/A |
| Fluorine Content | 62 | 65 | 28 | 11 | % |
| True Density | 2.7 | 2.5 | 2.1 | 1.9 | g/cc |
| Bulk Density | 0.6 | 0.1 | 0.1 | 0.09 | g/cc |
| Decomposition Temperature | 630 | 500 | 450 | 380 | ° C. |
| Median Particle Size | 8 | 1 | 1 | 1 | micrometers |
| Surface Area | 130 | 340 | 130 | 170 | $m^2/g$ |
| Thermal Conductivity | $10^{-3}$ | $10^{-3}$ | $10^{-3}$ | N.A. | cal/cm-sec-° C. |
| Electrical Resistivity | $10^{11}$ | $10^{11}$ | $10^8$ | 10 | ohm-cm |
| Color | Gray | White | Black | Black | N/A |

As has been described herein, an important advantage of the invention is the capability to vary the fluorine content of the fluorinated carbon to permit systematic uniform variation of the resistivity properties of the foam layer. The preferred fluorine content will depend on, inter alia, the equipment used, equipment settings, desired resistivity, and the specific polymer chosen for the foamed layer. The preferred fluorine content in the fluorinated carbon is from about 1 to about 70 weight percent based on the weight of fluorinated carbon (carbon content of from about 99 to about 30 weight percent), preferably from about 5 to about 65 (carbon content of from about 95 to about 35 weight percent), and particularly preferred from about 10 to about 30 weight percent (carbon content of from about 90 to about 70 weight percent).

The median particle size of the fluorinated carbon can be less than 1 micron and up to 10 microns, is preferably less than 1 micron, preferably from about 0.001 to about 1 microns, and particularly preferred from about 0.5 to 0.9 micron. The surface area is preferably from about 100 to about 400 $m^2/g$, preferred of from about 110 to about 340, and particularly preferred from about 130 to about 170 $m^2/g$. The density of the fluorinated carbons is preferably from about 1.5 to about 3 g/cc, and more preferably from about 1.9 to about 2.7 g/cc.

The amount of fluorinated carbon in the foam layer is preferably an amount to provide a bulk resistivity of from about $10^3$ to about $10^{13}$ ohm-cm. For a biasable charging member, an embodiment of which is shown in FIG. 2, the desired bulk resistivity is from about $10^3$ to about $10^8$ ohm-cm, and preferably from about $10^3$ to about $10^6$ ohms-cm. For a biasable transfer member, an embodiment of which is shown in FIG. 3, the desired bulk resistivity is from about $10^6$ to about $10^{13}$ ohms-cm, and preferably from about $10^7$ to about $10^{12}$ ohm-cm. Preferably, the amount of fluorinated carbon is from about 1 to about 50 weight percent, preferably from about 3 to about 30 weight percent, and particularly preferred from about 3 to about 28 weight percent based on the weight of total solids. Total solids as used herein refers to the amount of polymer, additives, any other fillers, and any other solid materials remaining in the finished foam after any foaming agent has been removed. In other words, total solids does not include the foaming agent(s).

It is preferable to mix different types of fluorinated carbon to tune the mechanical and electrical properties. It is desirable to use mixtures of different kinds of fluorinated carbon to achieve good resistivity, while achieving good mechanical and surface properties. Also, mixtures of different kinds of fluorinated carbon can provide an unexpected wide formulation latitude and controlled and predictable resistivity.

For example, an amount of from about 0.1 to about 40 percent, preferably from about 1 to about 40, and particularly preferred of from about 5 to about 35 percent by weight of ACCUFLUOR® 2010 can be mixed with an amount of from about 0.1 to about 40 percent, preferably from about 1 to about 40, and particularly preferred from about 5 to about 35 percent ACCUFLUOR® 2028, and even more particularly preferred from about 6 to about 25 percent ACCUFLUOR® 2028. Other forms of fluorinated carbon can also be mixed. Another example is an amount of from about 0.1 to about 40 percent ACCUFLUOR® 1000, and preferably from about 1 to about 40 percent, and particularly preferred from about 5 to about 35 percent, mixed with an amount of from about 0.1 to about 40 percent, preferably from about 1 to about 40, and particularly preferred from about 1 to about 35 percent ACCUFLUOR® 2065. All other combinations of mixing the different forms of ACCUFLUOR® are possible. A preferred mixture is from about 0.1 to about 15 percent ACCUFLUOR® 2028 mixed with from about 2 to about 3.5 percent ACCUFLUOR® 2010. Another preferred mixture is from about 0.5 to about 10 percent ACCUFLUOR® 2028 mixed with from about 2.0 to about 3.0 percent ACCUFLUOR® 2010. A particularly preferred mixture is from about 1 to about 3 percent ACCUFLUOR® 2028 mixed with from about 2.5 to about 3 percent ACCUFLUOR® 2010, and even more preferred is a mixture of about 3 percent ACCUFLUOR® 2010 and about 2 percent ACCUFLUOR® 2028. All the above percentages are by weight of the total solids as defined above.

The fluorinated carbon filled polymer foam layer preferably comprises a polymer having a suitable high tensile modulus. Preferably, the polymer is one that is capable of becoming a conductive film upon the addition of electrically conductive particles, and preferably one that is relatively easy to foam. The polymer must be capable of exhibiting high mechanical strength, be flexible, and be resistive. A polymer having a high tensile modulus is preferred because the high tensile modulus optimizes the film stretch registration. The polymer used herein has the advantages of improved flex life and image registration, and improved electrical properties including a uniform resistivity within the desired range.

Specific examples of suitable polymers useful in the fluorinated carbon filled polymer foam layer include chlorinated or chlorosulfonated polyethylene, polyamides, styrene-acrylonitrile copolymers, polyimides, ethylene-propylene copolymers poly(vinylchloride), polyisocyanates, polyphenols, epoxy resins, polystyrene, polyolefins, cellulose acetates, urea-formaldehyde resins, polyurethanes, polyesters, fluoropolymers, silicone materials, acrylonitrile-butadienes, polypropylenes, nitrile rubbers, various other elastomeric materials such as those listed in chapter 3 in Hofmann's "Rubber Technology Handbook", published by Hanser Publishers, Munich Vienna New York (the subject matter of which is hereby incorporated by reference in its entirety), and like materials.

Preferably, the polymer material is a fluoropolymer, such as monomers or polymers of fluorinated ethylene propylene (FEP), perfluoroalkoxy resin (FPA), polytetrafluoroethylene (PTFE), other TEFLON®-like polymers, and mixtures thereof. Particularly preferred polymers include fluoroelastomers. Examples of preferred fluoroelastomers include those described in detail in U.S. Pat. Nos. 5,166,031, 5,281,506, 5,366,772 and 5,370,931, together with U.S. Pat. Nos. 4,257,699, 5,017,432 and 5,061,965, the disclosures of which are incorporated by reference herein in their entirety. As described therein these fluoroelastomers, particularly from the class of copolymers and terpolymers of vinylidenefluoride, hexafluoropropylene and tetrafluoroethylene, and tetrapolymers of vinylidenefluoride, hexafluoropropylene, tetrafluoroethylene and a cure site monomer (examples of cure site monomers including 4-bromoperfluorobutene-1,1,1-dihydro-4-bromoperfluorobutene-1, 3-bromoperfluoropropene-1,1,1-dihydro-3-bromoperfluoropropene-1, and commercially available cure site monomers available from, for example, DuPont) are known commercially under various designations as VITON A®, VITON E®, VITON E60C®, VITON E430®, VITON 910®, VITON GH®, VITON B50®, VITON E45®, and VITON GF®. The VITON® designation is a Trademark of E.l. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly (propylene-tetrafluoroethylenevinylidenefluoride) both also available from 3M Company, as well as the TECNOFLONs identified as FOR-60KIR®, FOR-LHF®, NM® FOR-THF®, FOR-TFS®, TH®, TN505® available from Montedison Specialty Chemical Company.

Preferred fluoroelastomers are those which contain one or both of hexafluoropropylene and tetrafluoroethylene as comonomers. Two preferred known fluoroelastomers are (1) a class of copolymers of vinylidenefluoride and hexafluoropropylene known commercially as VITON A® and (2) a class of terpolymers of vinylidenefluoride, hexafluoropropylene and tetrafluoroethylene known commercially as VITON B®.

In another preferred embodiment, the fluoroelastomer is one having a relatively low quantity of vinylidenefluoride, such as in VITON GF®. The VITON GF® is a tetrapolymer having 35 mole percent of vinylidenefluoride, 34 mole percent of hexafluoropropylene, 29 mole percent of tetrafluoroethylene, and 2 mole percent cure site monomer.

Examples of fluoroelastomers suitable for use herein for the foam material include elastomers of the above type, along with volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures each of which are herein incorporated by reference in their entirety.

Volume graft, in embodiments, refers to a substantially uniform integral interpenetrating network of a hybrid composition, wherein both the structure and the composition of the fluoroelastomer and polyorganosiloxane are substantially uniform when taken through different slices of the biasable member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer.

In embodiments, the polyorganosiloxane having functionality according to the present invention has the formula:

where R is an alkyl from about 1 to about 24 carbons, or an alkenyl of from about 2 to about 24 carbons, or a substituted or unsubstituted aryl of from about 6 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n represents the number of segments and is, for example, from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

Specifically, the polymer is added in an amount of from about 50 to about 99 percent, preferably about 70 to about 99 percent by weight of total solids. Preferably, a conductive filler such as, for example, fluorinated carbon is present in the foam layer in an amount of from about 1 to about 50, and preferably from about 1 to about 30 percent by weight based on the weight of total solids.

Generally, a conductive foam can be prepared by use of known techniques including adding gas or blowing agent to the composition which forms a closed cell foam structure, adding salts to the composition which are later leached away to form an open cell structure, directly introducing a gas into the composition, or by coagulations techniques to produce open cell or closed cell structures depending on the process conditions chosen. These processes are well known and are fully described in the literature, for example, *The Encyclopedia of Chemical Technology*, Third edition, Vol. 11, pp. 82–126. Suitable blowing agents produce gas and generate cells or gas pockets in polymer materials. Blowing agents are well known and, for example, are listed in the *Encyclopedia of Polymer Science and Engineering*, Vol. 2, starting on page 434. Specific examples of physical blowing agents include pentanes, pentenes, hexanes, hexenes, heptanes, heptenes, benzenes, toluenes, methanes, ethanes, alcohols, ketones and the like. Specific examples of chemical blowing agents include sodium bicarbonate, dinitrosopentamethylenetetramine, p-toluenesulfonyl hydrazide, 4,4'-oxybis(benzenesulfonyl hydrazide), azodicarbonamide (1,1'-azobisformamide), p-toluenesulfonyl semicarbazide, 5-phenyltetrazole, 5-phenyltetrazole analogues, diisopropylhydrazodicarboxylate, and 5-phenyl-3,6-dihydro-1,3,4-oxadiazin-2-one. By adding salts to the composition which are later leached away, an open cell structure can be formed. By reducing the soluble salt concentration in the composition, a closed cell product may be formed. Most water soluble salts or compounds (organic and inorganic) may be used as the salt including magnesium sulfate, sodium chloride, sodium nitrate, urea, citric acid, and the like. Coagulation processes in which the polymer solvent is replaced by a non-solvent causing the polymer to precipitate and generate channels or pore sites may also be used to produce a foamed article. These processes are also well known and are described in the literature, for example, *Encyclopedia of Chemical Technology*, Third ed., Vol. 14, p. 231–249.

The foaming technique is used to generate a preferred pore size so as to reduce the occurrence of relatively large amounts of toner becoming trapped inside the pores of the foam. The diameter of toner is generally about 10 microns. Penetration of toner particles into the foam tends to increase the hardness of the foam. It is preferred that the diameter of the pore openings of the foam be at most twice an average diameter of the toner particles, in order to prevent potentially detrimental penetration of the toner particles into the pores. Therefore, the pores of the foam layer preferably have an average diameter of from about 0.1 to about 20 microns, preferably from about 1 to about 15 microns and particularly preferred from about 1 to about 9 microns.

The biasable member employed for the present invention can be of any suitable configuration.

Figure 4:
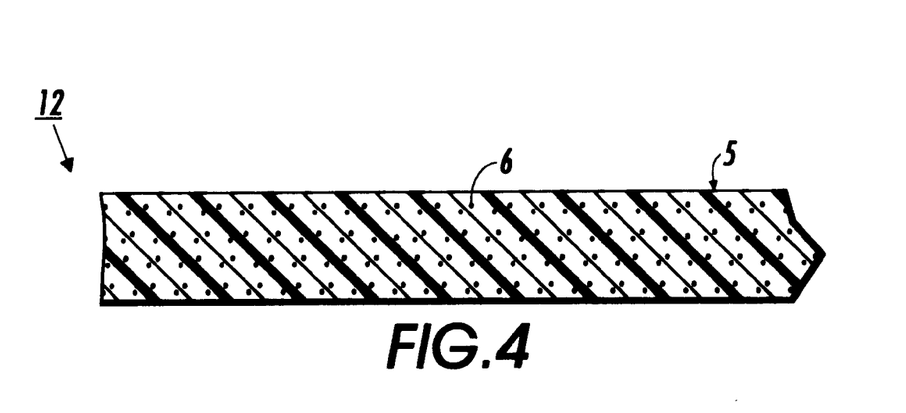
FIG. 4 is a sectional view of an embodiment of the present invention, with a biasable film, sheet, belt or sleeve component comprising a fluorinated carbon filled foam substrate.

FIG. 4 is a sectional view of an embodiment of the present invention, wherein a biasable member 12 in the form of an unsupported belt, sheet, sleeve or film comprising a foam 5 filled with fluorinated carbon filler 6 is depicted. In this embodiment as shown in FIG. 4, there may be one or more layers of the fluorinated carbon filled foam.

Figure 5:
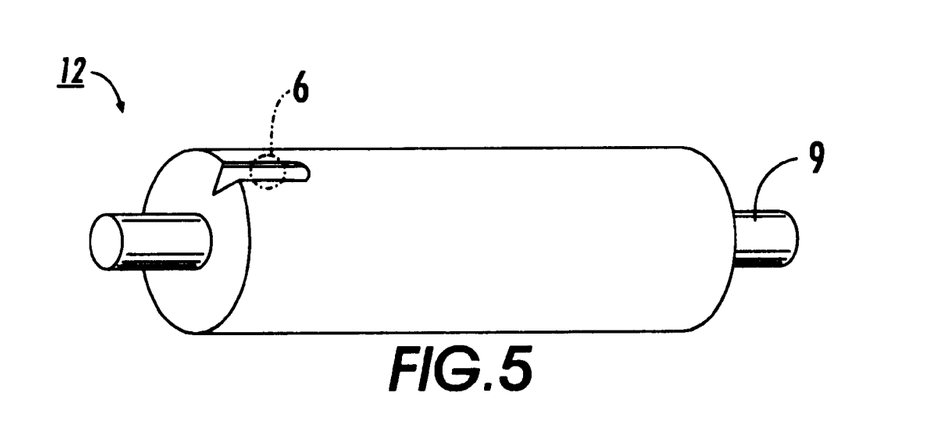
FIG. 5 is a sectional view of an embodiment of the present invention, with a biasable roller component comprising a fluorinated carbon filled foam substrate.
Figure 6:
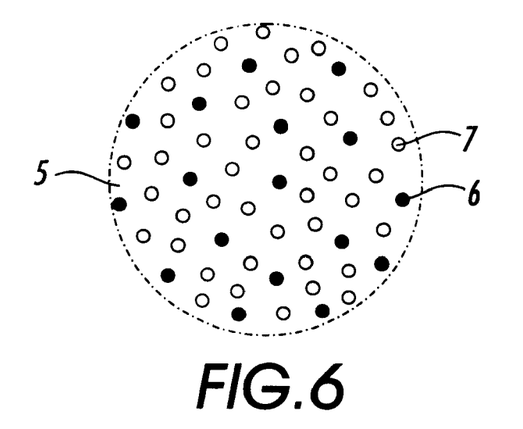
FIG. 6 is an enlarged view of an embodiment of the present invention, and demonstrates pores in the foam.

FIG. 5 depicts a biasable roller member 12 comprising a shaft 9 and a foam 5 having pores 7 and filled with fluorinated carbon filler 6. FIG. 6 contains a blow-up view of the foam material 5 with foam pores 7 and fluorinated carbon filler 6 dispersed or contained therein.

Examples of suitable configurations for the biasable member include a sheet, a film, a web, a foil, a strip, a coil, a cylinder, a drum, an endless strip, a circular disc, a belt including an endless belt an endless seamed flexible belt an endless seamless flexible belt, an endless belt having a puzzle cut seam, and the like. It is preferred that the belt comprise a substrate in the form of an endless seamed flexible belt or seamed flexible belt, which may or may not include puzzle cut seams. Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method of manufacturing reinforced seamless belts is set forth in U.S. Pat. No. 5,409,557, the disclosure of which is hereby incorporated by reference in its entirety. Examples of suitable substrates having the foam material thereover include metallic materials such as stainless steel, nickel aluminum and the like as well as organic polymeric materials such as polyimide, poly (amide-imide), polyetherimide, siloxane polyetherimide block copolymer such as for example SILTEM® STM-1300 available from General Electric, Pittsfield, Mass., and the like. Other suitable substrate materials include aromatic polyamide polymers available from DuPont, Wilmington, Del. under the NOMEX® and KELVAR® tradename, polyphenylenesulphide such as FORTON® available from Hoechst-Celanese, Greer, S.C., and also Aromatic Liquid Crystal Polyester polymers such as VECTRA® sold by Hoechst-Celanese, Greer, S.C.

In the case of a belt, film, sheet or sleeve type configuration for the foam biasable member, the foam layer may be coated directly on the substrate or laminated thereon using suitable adhesives. Suitable adhesives include known pressure sensitive adhesives as well as thermosetting adhesives.

In the case of a roller type configuration for the foam biasable member, it is preferable that the foam material be formed around a hollow or solid metal shaft comprising a metal such as nickel, steel, aluminum, or the like metal. Alternatively, an organic polymer such as a phenol-formaldehyde resin, glass or carbon fiber reinforced epoxy or other suitable polymer or composite material that can be rendered electrically conductive by suitable conductive fillers such as carbon black, metal powders, conductive oxides, and organic conductive fillers, can be molded, extruded or otherwise shaped into a rod or shaft. A suitable adhesive materials may be used to adequately bond the metal shaft member to the conductive foam material. Suitable adhesives include known thermosetting adhesives.

Figure 7:
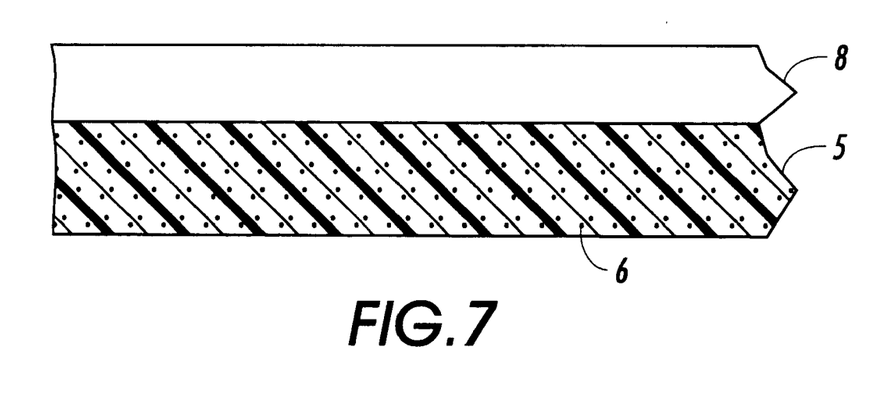
FIG. 7 is a sectional view of an embodiment of the present invention showing at least one layer on a foam layer.

FIG. 7 depicts another embodiment of the invention, wherein the fluorinated carbon filled foam 5 can have at least one layer 8 thereon.

The outer layer of layers can be any suitable release material including silicone rubbers, fluorosilicone, volume graft, polytetrafluoroethylene (PTFE), fluorinated ethylene propylene copolymer (FEP), polyfluoroalkoxy polytetrafluoroethylene (PFA TEFLON®) and the like.

Addition of fluorinated carbon to a polymer usually increases the hardness of the polymer, resulting in inadequate nip performance. In the present invention, addition of fluorinated carbon to the polymer does not result in such an increase in the hardness of the polymer layer due to the foaming of the layer. The polymer foam preferably has a hardness of from about 30 to about 65 and preferably from about 55 to about 60 Shore A. This superior hardness decreases or minimizes the damage and scratching to the photoreceptor or other member to which the biasable member may come in contact.

A bias can be supplied to the biasable member in various ways. A bias may be supplied to the biasable member through another biasable member such as a biasable supplying member (for example, element 7 in FIG. 2) capable of receiving a bias from an electrical bias source (such as 11 in FIGS. 1, 2 and 3), wherein the electrical bias source is connected to the bias supplying member for directing or supplying electrical current thereto, and wherein the bias supplying member is capable of transferring or supplying the charge to the bias charging member or bias transfer member. The biasable supplying member may be in direct contact or in charging contact with said biasable transfer or biasable charging member so that the biasable charging member or biasable transfer member is capable of receiving and transferring or spraying the charge to a substrate, such as a photoreceptor or copy substrate. In an alternative embodiment, the bias may be directly supplied to the bias charging member or bias transfer member.

As set forth above, the biasable member may be in the form of a roller, belt, sheet, sleeve, or film. The bias may be applied through shafts, for example, stainless steel shafts. One advantage of using a belt embodiment, is that one can engineer a larger pre-nip and post-nip region. For AC/DC operation, when a DC bias has exceeded a certain limit, micro-corona may be generated in both the pre-nip and the post-nip regions, which may result in charging of the photoreceptor. A larger pre-nip and post-nip region can increase the efficiency of photoreceptive charging. Therefore, a belt configuration for the biasable member is preferred.

The bias is typically controlled by use of a DC potential, and an AC potential is typically used along with the DC controlling potential to aid in charging control. The advantage of using AC lies in the reduction of the surface contamination sensitivity and to ensure that the charging is uniform. The AC creates a corona in the pre- and post-nip regions of the devices so that the charging component related to the charge injection in the nip is less important. The AC bias system is proportional to the process speed. This sometimes limits the application of bias devices to low speed machines. Use of AC in addition to DC increases the cost of the system. Therefore it is desirable to use only a DC. However, use of only DC bias usually requires materials with an optimum, stable resistivity. Otherwise, use of a single DC bias will result in charging non-uniformity and pre-nip breakdown.

Since the present surfaces, in embodiments, allow for optimum and stable resistivities as set forth herein, the biasable member of the present invention may only include a DC bias charging system, without the need for an AC bias. In addition, the present invention can be used with electroded field tailoring with an electroded substrate, or with double bias field tailoring without electrodes. These latter two approaches are useful with a stationary film charging system or bias transfer films.

Also, in embodiments, the present invention may be used in double bias systems, such as electroded and/or non-electroded rollers or film chargers. This allows for selective tuning of the system to post-nip breakdown, thereby improving the charge uniformity. Post-nip breakdown is more uniform than pre-nip breakdown. By choosing a specific material for the outer layer of the biasable member such as described herein, the resistivity can be set within the desired range so that only post-nip breakdown occurs. Further, by biasing post-nip and pre-nip differently, post-nip discharge can be achieved. The term in the art for selectively biasing post-nip is referred to as field tailoring.

Specific embodiments of the invention will now be described in detail. These examples are intended to be illustrative, and the invention is not limited to the materials, conditions, or process parameters set forth in these embodiments. All parts are percentages by solid weight unless otherwise indicated.

EXAMPLES

Example 1

Preparation of Fluoroelastomer Masterbatch Solution

A masterbatch solution of fluoroelastomer (VITON® GF) was prepared as follows. An amount of about 250 grams of VITON® GF was mixed with about 37.5 grams $CaOH_2$, about 1350 grams methyl isobutyl ketone, and about 900 grams methyl ethyl ketone. This mixture was roll milled to dissolve the polymer and disperse the $CaOH_2$. About 10 grams VITON® Curative 50 (from DuPont and comprising a blend of an organophosphonium salt and a dihydroxy aromatic compound) was added to this roll milled solution, and the mixture thoroughly mixed.

Example 2
Preparation of Conductive Fluoroelastomer Foam Composition (14.6 weight percent fluorinated carbon)

About 20 grams of VITON® GF masterbatch prepared in Example 1 was dispersed with 0.4 grams of ACCU-FLUOR® 2028. A glass shot was added to the mixture and the mixture stirred in a container to break down the pigment particle size. An amount of about 30 grams of $MgSO_4$ was then added to the mixture and stirred to achieve a relatively uniform dispersion. The $MgSO_4$ particle size distribution was relatively broad with the largest particles about 125 mils. The mixture was placed into a 3.5 inch diameter glass dish and the dish was subjected to vibration to help level the material into a uniform thickness. The mixture was then air dried for about 1 hour. The dish containing the mixture was then put in an oven at 75° C. for 1 hour to evaporate more of the solvent. Then, the dish was heated an additional 3 hours at 150° C. The mixture was then cured for about 18 hours at 200° C., removed from the oven, and cooled to room temperature (about 25° C.). The dish was put into a sink with hot running water so that the $MgSO_4$ dispersed throughout the fluoropolymer dissolved, thereby creating a pore structure in the cured fluoroelastomer corresponding to the original particle size of the $MgSO_4$. The solid mixture was then removed from the dish after the $MgSO_4$ was substantially all dissolved away, and was dried to yield a fluorinated carbon pigmented fluoroelastomer foam material. The thickness of the dried disk was about 15 mils. The effective bulk resistivity of the material was greater than $10^6$ ohm-cm and the Shore A durometer was about 55.

Example 3
Preparation of Conductive Fluoroelastomer Foam Composition (26.8 weight percent fluorinated carbon)

About 35 grams of VITON® GF masterbatch prepared in Example 1 was dispersed with 1.5 grams of ACCU-FLUOR® 2028 in a 6 ounce glass jar. A glass shot was added to the mixture and the mixture stirred in a container to break down the pigment particle size. The solution was then roll milled for about 20 hours to disperse the fluorinated carbon. About 200 grams of $MgSO_4$ was put into a separate glass jar with glass beads and milled for about 20 hours to break up agglomerates and to reduce the particle size of the salt. The milled salt was sieved through a 325-mesh screen to yield a powder size less than about 45 microns. About 40 grams of the sieved $MgSO_4$ was added to the milled VITON® GF/ACCUFLUOR® 2028 dispersion by stirring. The mixture was then put into a glass dish, air dried, forced air dried, cured and then processed as in Example 2 to recover about a 30 mil thick fluorinated carbon fluoropolymer foam article. The bulk resistivity of the foam material was about $10^{11}$ ohms-cm. The hardness was about 60 Shore A, and the pore cell size of the foam was found to be much smaller than that measured in Example 2.

Example 4
Preparation of Conductive Fluoroelastomer Foam Composition (20 weight percent fluorinated carbon)

About 35 grams of VITON® GF masterbatch prepared in Example 1 was dispersed with 1.0 grams of ACCU-FLUOR® 2010 in a 6 ounce glass jar. A glass shot was added to the mixture and the mixture stirred in a container to break down the pigment particle size. The solution was then roll milled for about 20 hours to disperse the fluorinated carbon. About 30 grams of sieved $MgSO_4$ (prepared as in Example 3) was added to the dispersion by stirring. The mixture was then put into a dish and dried, cured and processed as in Example 2, to yield a foam article as obtained in Example 2 above. The bulk resistivity of the material was measured to be between about $10^3$ and about $10^6$ ohm-cm.

Example 5
Preparation of an Electrically Conductive Roller

An electrically conductive roller can be prepared using the materials/formulation and the foaming procedures as described in Examples 1 and 2, with the exception that the foaming process can be carried out in a is cylindrical mold of approximately 40 mm in diameter and approximately 310 mm in length. This cylindrical mold can be used in place of the dish. After the foaming process is completed, a stainless steel shaft (about 8 mm in diameter and about 330 mm long) can be inserted into the center of the mold. The conductive foam roll is then ground to an outside diameter of about 14 mm. The roll can then be altered for use as a bias transfer roller in an electrophotographic machine.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

Unless otherwise specified, amounts are percentage by weight of total solids.

We claim:

1. A biasable component comprising a fluorinated carbon filled polymer foam layer, wherein the component is electrically conductive and is capable of receiving a bias, wherein said polymer foam is a fluoropolymer foam and comprises a fluoropolymer selected from the group consisting of a) copolymers of vinylidenefluoride and hexafluoropropylene; b) terpolymers of vinylidenefluoride, hexafluoropropylene and tetrafluoroethylene, and c) tetrapolymers of vinylidenefluoride, hexafluoropropylene, tetrafluoroethylene, and a cure site monomer.

2. A biasable component in accordance with claim 1, wherein said fluoropolymer comprises 35 mole percent of vinylidenefluoride, 34 mole percent of hexafluoropropylene, 29 mole percent of tetrafluoroethylene and 2 percent cure site monomer.

3. A biasable component comprising a fluorinated carbon filled polymer foam layer, wherein the component is electrically conductive and is capable of receiving a bias, wherein said polymer foam further comprises a filler selected from the group consisting of carbon black, graphite, metal powder, metal oxide, and mixtures thereof.

4. A biasable component comprising a fluorinated carbon filled polymer foam layer, wherein the component is electrically conductive and is capable of receiving a bias, wherein said polymer foam has an average pore diameter of from about 1 to about 9 microns.

5. A biasable component comprising a fluorinated carbon filled polymer foam layer, wherein the component is electrically conductive and is capable of receiving a bias, wherein said polymer foam layer has a hardness of from about 30 to about 60 Shore A.

6. A biasable component in accordance with claim 5, wherein said fluorinated carbon is present in an amount of from about 1 to about 50 percent by weight based on the weight of total solids.

7. A biasable component in accordance with claim 5, wherein said fluorinated carbon has a fluorine content of from about 1 to about 70 weight percent based on the weight of fluorinated carbon, and a carbon content of from about 99 to about 30 weight percent based on the weight of fluorinated carbon.

8. A biasable component in accordance with claim 5, wherein the fluorinated carbon is of the formula $CF_x$, wherein x represents the number of fluorine atoms and is from about 0.01 to about 1.5.

9. A biasable component in accordance with claim 5, wherein said fluorinated carbon is selected from the group consisting of a fluorinated carbon having a fluorine content of about 62 weight percent, a fluorinated carbon having a fluorine content of about 11 weight percent, a fluorinated carbon having a fluorine content of about 28 weight percent, and a fluorinated carbon having a fluorine content of about 65 weight percent based on the weight of fluorinated carbon.

10. A biasable component in accordance with claim 5, wherein the polymer foam is selected from the group consisting of polyurethane foam, polyester foam, fluoropolymer foam, silicone foam, acrylonitrile-butadiene foam, nitrile rubber foam, and polypropylene foam.

11. A biasable component in accordance with claim 5, wherein the electrically conductive component is biased by a DC bias potential.

12. A biasable component in accordance with claim 5, wherein the electrically conductive component is biased by a DC and an AC bias potential.

13. A biasable component in accordance with claim 5, wherein the electrically conductive component is in the form of an endless belt.

14. A biasable component in accordance with claim 5, wherein the electrically conductive component is in the form of a roller having a cylindrical core.

15. A biasable component in accordance with claim 5, wherein said polymer foam has a bulk resistivity of from about $10^3$ to about $10^{13}$ ohms-cm.

16. A biasable component in accordance with claim 5, further comprising at least one layer positioned on said polymer foam layer.

17. An electrostatographic machine comprising a biasable component capable of receiving an electrical bias, wherein said biasable component comprises a fluorinated carbon filled polymer foam layer and wherein said component is electrically conductive and is capable of receiving a bias, wherein said polymer foam layer has a hardness of from about 30 to about 60 Shore A.

18. The electrostatographic machine of claim 17, wherein said biasable component is adapted for providing charge to an imaging surface.

19. The electrostatographic machine of claim 18, wherein said fluorinated carbon filled polymer foam layer has a bulk resistivity of from about $10^3$ to about $10^8$ ohms-cm.

20. The electrostatographic machine of claim 17, wherein said biasable component is adapted for transferring toner particles from an image support surface to a copy substrate.

21. The electrostatographic machine of claim 20, wherein said fluorinated carbon filled polymer foam layer has a bulk resistivity of from about $10^6$ to about $10^{13}$ ohms-cm.

22. The electrostatographic machine of claim 17, further comprising a bias supplying member and an electrical bias source connected to said bias supplying member for providing electrical current thereto, wherein said bias supplying member is capable of contacting said biasable component.

* * * * *